June 16, 1931. C. W. VOGT 1,810,740
APPARATUS FOR CONTINUOUS PRODUCTION OF BRICKS
OF ICE CREAM OR ANALOGOUS MATERIAL
Filed Oct. 25, 1929 2 Sheets-Sheet 2

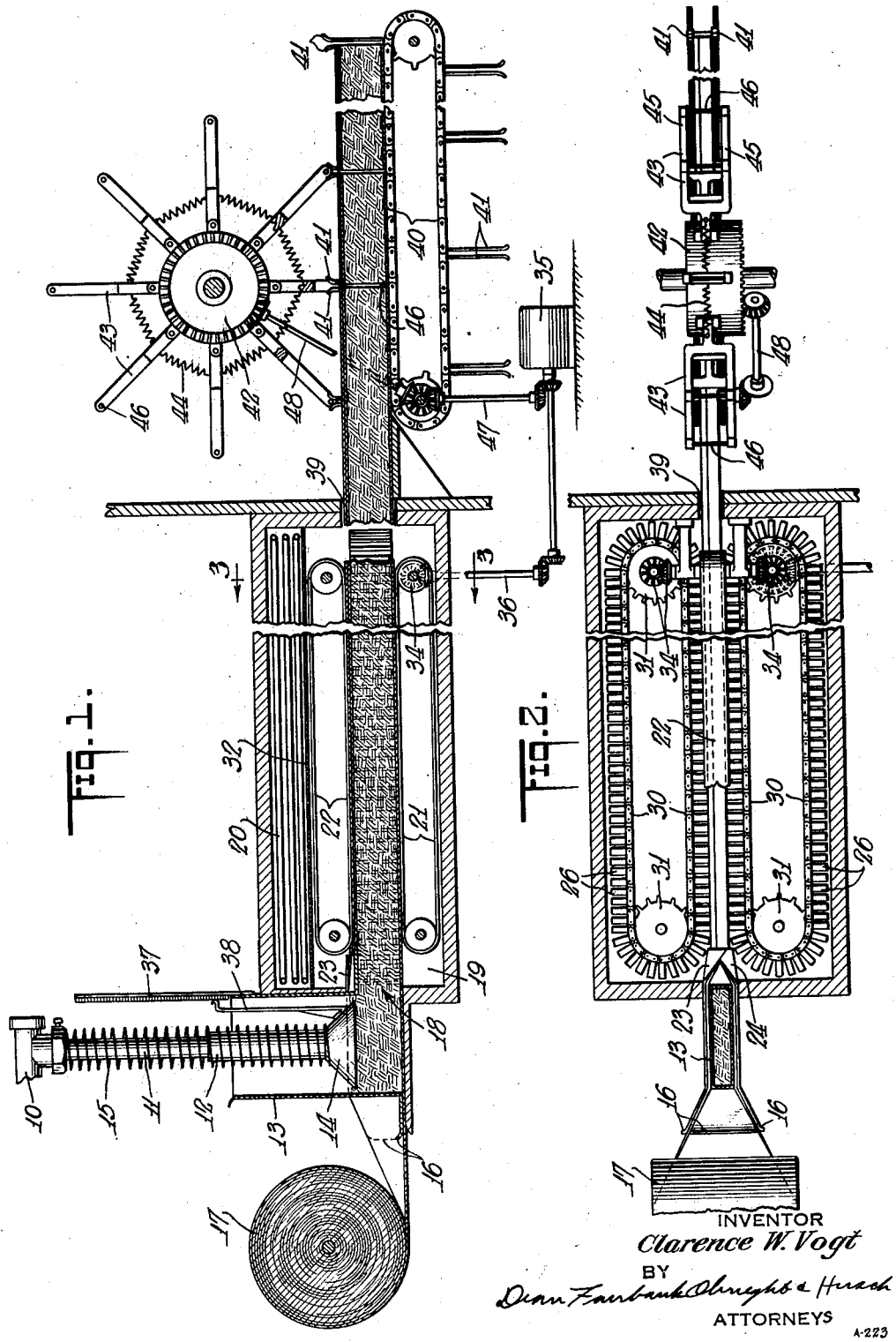

INVENTOR
Clarence W. Vogt
BY
ATTORNEYS

Patented June 16, 1931

1,810,740

UNITED STATES PATENT OFFICE

CLARENCE W. VOGT, OF LOUISVILLE, KENTUCKY, ASSIGNOR TO VOGT INSTANT FREEZERS INCORPORATED, OF LOUISVILLE, KENTUCKY, A CORPORATION OF DELAWARE

APPARATUS FOR CONTINUOUS PRODUCTION OF BRICKS OF ICE CREAM OR ANALOGOUS MATERIAL

Application filed October 25, 1929. Serial No. 402,339.

This invention relates to the continuous production of ice cream or other analogous material in brick or block form. The process employed in the improved apparatus herein claimed is claimed in my copending divisional application, Serial No. 507,629, filed January 9th, 1931.

In the manufacture of ice cream it is customary to first partially freeze the mix to a plastic condition and thereafter place the partially frozen ice cream in the hardening room where it remains at such a low temperature that the freezing progresses to the desired point. If it is desired to make ice cream bricks or bodies of definite size and form the partially frozen ice cream is packed in molds which are placed in the hardening room. Considerable time is required in the filling of the molds and a long time is required for hardening.

In my prior Patent No. 1,733,740, dated Oct. 29, 1929, I have disclosed and broadly claimed an apparatus in which the partially frozen ice cream with the air whipped therein is continuously delivered to a conveyor in the hardening room. The ice cream is continuously advanced through the hardening room while subjected to very low temperature so that as it is delivered from the hardening room or chamber the freezing action has been completed to the desired extent and the ice cream is sufficiently hard for shipment or direct consumption. My present invention is an improvement on the apparatus disclosed in said patent and involves various important features.

As one important feature the conveyor is so designed that it acts to directly cool the ice cream while advancing it and maintain it of a definite cross-sectional area.

As another important feature the ice cream is caused to assume a definite form in cross-section as it enters the hardening room so that it is frozen as a continuous bar of the desired cross-sectional area.

As a further important feature the ice cream is delivered to a wrapper which is folded about the ice cream as the latter assumes the desired form so that the hardening takes place while the ice cream is retained by the wrapper.

As a further important feature I provide for the automatic subdividing of the bar of ice cream into bricks, blocks or pieces of the desired size as it is delivered from the hardening room.

As a further important feature I provide means for automatically controlling the speed of the conveyor in accordance with the rate of delivery of the partially frozen ice cream from its source of supply.

As a further important feature I provide a novel form of conveyor which presses the ice cream to the desired cross-sectional form while directly cooling and advancing the material.

In the accompanying drawings I have illustrated only one embodiment of my invention, but it will be apparent that various changes may be made in the details of construction and the arrangement of the parts within the scope of the appended claims and without departing from the spirit of my invention.

In these drawings:

Fig. 1 is a vertical longitudinal section through the apparatus;

Fig. 2 is a top plan view of certain of the parts, other parts being shown in section;

Figure 3:
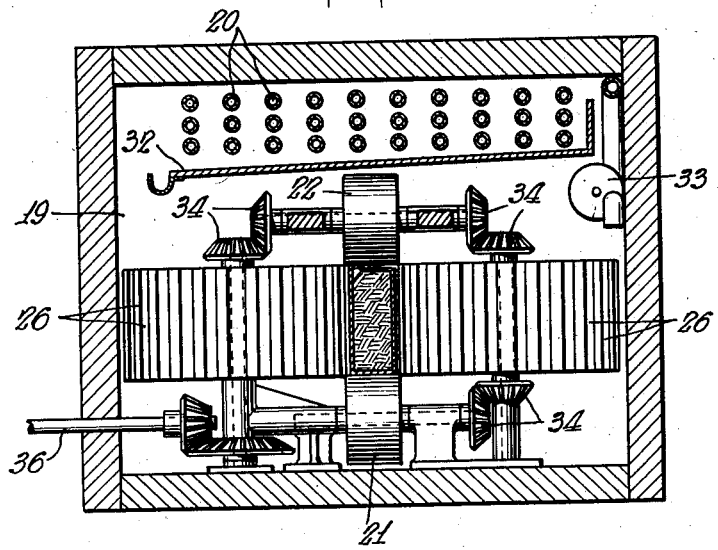
Fig. 3 is a vertical transverse section on the line 3—3 of Fig. 1, but on a larger scale.

In the specific form illustrated the ice cream is delivered from any suitable source through a conduit 10. The ice cream may be delivered from such apparatus as is shown in my Patents 1,783,864, and 1,783,865, dated December 2nd, 1930. The ice cream has previously been partially frozen and had air whipped into it to give the desired overrun. The supply conduit 10 may be connected directly to a continuously delivering freezer or it may be connected to a hopper in which batches are delivered from one or more batch freezers of the usual type.

The supply conduit 10 is provided with a delivery conduit including two telescoping sections 11 and 12 depending therefrom and terminating within a receptacle 13. The lower end of the lower section 12 is provided with a head or member 14 beneath which the ice cream is delivered under pressure. The head maintains at least some of this pressure and smooths out the material within the receptacle. The two sections are encircled by a coil spring 15 which may tend to lift the lower section against gravity and in opposition to the friction or drag of the material passing through the lower section 12.

The details of this part of the apparatus are not hereinafter claimed specifically as they form the subject matter of a separate application Serial No. 402,362, filed Oct. 25, 1929.

The lower part of the receptacle 13 is of a width substantially equal to the width of the desired ice cream brick and the head 14 is preferably of slightly less width and of approximately the same cross-sectional form as the receptacle 13 so that the head may freely move vertically without contacting with the walls of the receptacle. One vertical wall of the receptacle 13 has a transverse slit at the angle of intersection of the bottom and vertical slits at the angles of intersection of the two sides. Leading to these slits are paper guides 16 so that paper from a roll 17 may be folded to substantially channel shape and delivered transversely through the lower portion of the receptacle to form a lining for the bottom and for two opposite sides. If desired the paper may be creased or scored before being wound on the roll 17 so as to facilitate bending of the strip to channel form. I have shown the roll 17 comparatively close to the guides, but it is evident that the roll should be far enough away to permit the proper bending of the paper without tearing, undue stretching or wrinkling.

The receptacle at the side thereof opposite to the paper guides 16 is provided with an outlet 18 of approximately the width and height of the solid bar into which the ice cream is to be hardened. This outlet delivers directly into a hardening chamber 19 which is kept at a very low temperature by means of refrigerating coils 20 or other suitable cooling means. The temperature in the hardening chamber should be such in respect to the length of the chamber and the rate of travel of the material therethrough that the ice cream will be hardened at least to such an extent that it will hold definite form and may be readily handled as bricks or blocks after it emerges therefrom.

The means for transmitting the cooling action directly to the bar of ice cream and for simultaneously advancing the bar, constitutes an important feature of the invention.

In the form illustrated there are employed a pair of endless conveyors 21 and 22 mounted on suitable pulleys to provide parallel runs of the conveyors spaced apart to the height of the ice cream bar. As shown the upper run of the conveyor 21 forms a support for the bar while the lower run of the upper conveyor 22 engages with the upper surface of the bar. Between the inlet to the hardening chamber and the upper conveyor there is provided a paper guide or folding parts 23 and 24 for turning the free edges of the paper over onto the top of the ice cream bar in overlapping relationship so that neither conveyor directly engages with the material. The material is thus encased within a jacket or envelope which advances with the material. The conveyors 21 and 22 may be of any suitable material, although preferably they are of metal belts so that they have a comparatively high heat transferring effect and tend to cool the upper and lower surfaces of the bar. It will be evident that any heat which they extract from the bar will be directly radiated to the very cold air of the chamber and each conveyor, after leaving the ice cream bar, is recooled before re-engaging with the bar.

The bar is of very much greater height than width so that the surfaces which are exposed to contact with the conveyors 21 and 22 are comparatively narrow. The main hardening effect is effected by the extraction of heat from the two vertical sides of the bar as the latter advances.

Figure 4:
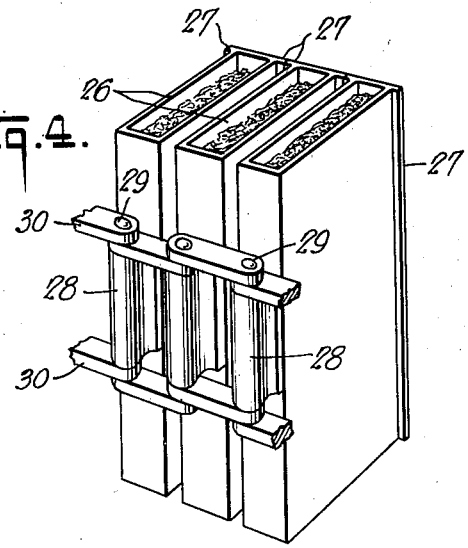
Fig. 4 is a perspective view of a portion of the freezing conveyor.

The conveyors which engage with the sides of the bar are preferably of a special construction which may be as shown in detail in Fig. 4. A plurality of receptacles 26 each carry a refrigerating medium of high capacity, such for instance as an ice and salt mixture. The receptacles are spaced to a short distance apart so that air may freely circulate therebetween while the operating surfaces are provided with laterally extending flanges 27 which abut to form a substantially continuous surface for direct engagement with the side surfaces of the ice cream bar. The several receptacles are connected together by links or are separately mounted on a chain or are otherwise connected so that they form an endless series. Merely as an example each receptacle is shown as provided with a series of lugs 28 serving as bearings for pintle pins 29 connected together by a series of links 30. These lugs 28 thus serve as transverse elements of a chain whereby the chain may be supported on and operated by a pair of sprocket wheels 31.

The flanges 27 of each receptacle are free from those of the adjacent receptacles so that the series may freely pass around the sprocket wheels as indicated in Fig. 2. These receptacles which are at very low temperature serve to extract sufficient heat from the ice cream through its movement in contact with the receptacles to effect the desired hardening of the material. During the return run of the receptacles and while they are out of contact with the material they are recooled by the intensely cold air in the chamber.

Preferably the refrigerating coils 20 are mounted at the upper part of the receptacle with a partition 32 therebeneath. This partition also serves as a drain member to prevent any condensation from dripping onto the apparatus therebeneath. There is preferably provided an air circulating means which is illustrated somewhat conventionally as a blower 33 for forcing air across the refrigerating coils above the partition 32 and causing this cooled air to continuously pass over and between the several receptacles 26. By reason of the fact that these receptacles contain a refrigerating agent they in themselves operate to directly chill the material, and any ice in them which has melted during the heat absorbing run with the material will be rechilled by the cold air during the return run. Therefore the receptacles serve not only as heat conductors, but also as storage reservoirs. They maintain their extremely low temperature throughout their heat absorbing run due to the nature of the refrigerant contained in the receptacles.

The shafts of the supporting pulleys for the conveyors 21, 22 and the shafts for the sprocket wheels are all interconnected by suitable gearing 34, as shown particularly in Fig. 3, so that all of the conveyors are advanced at the same rate. The four conveyors engage the four sides of the material and maintain it of the desired shape and cross-section during the hardening, but as previously noted they do not directly contact with the material, but only with the envelope or jacket which is around the latter. It is important that the conveyors operate with a speed which is directly proportional to the rate of delivery of the partially frozen material to the receptacle 13. To accomplish this purpose the conveyors may be operated from an electric motor 35 which operates to drive a shaft 36 which extends into the hardening chamber. The pressure applying and material distributing head 14 in the receptacle 13 will rise if the material is delivered to the receptacle at a faster rate than it is conveyed therefrom through the hardening room and will descend if the material is delivered to the receptacle 13 at a lower rate. This vertical movement of the head 14 or of some part connected to or associated therewith is utilized for controlling the speed of the electric motor.

As illustrated there is a rheostat 37 adjacent to the receptacle 13 and a movable contact bar 38 is connected to the head 14 so as to move along the rheostat. As the head 14 rises the rheostat will operate to deliver more current to the electric motor so as to operate the conveyors at a more rapid rate and as the head 14 descends the speed of the motor 35 will be reduced. The rheostat is only very conventionally illustrated as it will be obvious that the member 28 may be connected to the ordinary rheostat or to any other suitable mechanism which will operate to vary the speed of drive of the conveyors. Merely as an indication of such range of equivalency there may be a Reeves drive in the connection between the source of power 35 and the shaft 36 and the movement of the head 14 may operate through suitable mechanism to vary the driving speed relationship of such a Reeves drive. Various other means may be employed for accomplishing the same result.

The wall of the hardening chamber 19 opposite to the opening 18 is provided with an outlet 39 through which the hardened bar of ice cream is delivered. In some apparatus this bar may be cut into sections by hand and the separate sections conveyed to storage or for direct transportation to the retail stores or points of consumption, but preferably mechanism is provided for subdividing the bar into sections of uniform length. Merely as an example of such a mechanism I have illustrated a cutting apparatus of the wire type. A conveyor 40 supports the bar of material as it is delivered from the hardening room and this carries a series of guides 41 extending outwardly at right angles thereto. These project upwardly at opposite sides of the advancing ice cream bar to a distance slightly above the upper surface of the latter and the guides are preferably flared or spread apart at their free ends to facilitate the entry of the cutting wire therebetween. Mounted above the bar is a rotatable member 42 which carries the cutting elements and forces them downwardly through the ice cream between the several series of guides 41 as the latter advances with the material. Merely as an example of such a cutting mechanism I have shown the rotatable member 42 as provided with a series of arms 43 pivoted thereto and extending radially therefrom. These separate arms are connected by coil springs 44 so that they normally retain their radial positions and proper spacing. Each arm at its outer end is preferably forked or provided with separate tines 45 spaced apart to a distance slightly greater than the width of the ice cream bar and the guides which travel alongside of the bar. The two tines or forks of each arm are connected by a transversely extending cutting wire 46 which may pass downwardly through the material while guided by the guides 41, and thus sever the material into sections. The rotatable member 42 and its arms are so proportioned and so timed that as each pair of guides 41 advances, the cutting wire will enter therebetween, and as the movement continues the wire will be forced downwardly between the guides to the bottom of the ice cream bar and then move upwardly and out from between the guides.

As the bar moves at a substantially uniform rate in a straight line which is tangential to the direction of movement of the cutting wires, it will be evident that the wires must travel along with the bar at the same rate as the latter during the cutting action. The cutting wires may travel at a uniform rate in a circular path when out of contact with the material. The springs 44 permit the slight deceleration and acceleration of the arcuate movement of the cutting wires during the cutting action. The range of movement of the parts is such that the cutting wires pass not only through the bar of ice cream itself, but also through the paper which encloses it so as to completely sever the wrapped bar into sections. The cutting member as well as the conveyor 40 and guides 41 must, of course, vary their speed with any variation of the speed of the conveyors in the hardening room, and therefore they are preferably connected to and operated from the same source of power. Merely as an example I have shown the motor 35 driving the conveyor 40 through a shaft 47, and a further shaft 48 transmits the power to the rotatable member 42.

It will be noted that the material after it has been cut into sections will still be wrapped in paper on four sides and only the two ends will be exposed where the cutting has been done. Thus the blocks or bricks may be picked up and handled without directly contacting with the material and may be stored, conveyed and sold to the customer in this condition. It is, of course, obvious that if desired they may be additionally wrapped after the cutting so as to protect the exposed ends.

Due to the extremely efficient heat absorbing character of the conveyors, the material will be frozen to the desired hardness while traveling through a shorter chamber and at a faster rate than is possible with less efficient freezing means. Obviously the length of the chamber and the rate of travel of the conveyors are inter-related and may also be varied in accordance with the degree of hardness desired. The ice cream may be hardened to such an extent as will permit of its direct shipment and sale or in some cases the hardening need be only such as will insure the brick retaining its shape while delivered to a further hardening or storage chamber.

It will be noted that in the specific form of apparatus illustrated each receptacle 26 has a comparatively narrow heat absorbing surface juxtaposed to and in heat absorbing relationship to the material to be treated, and that the receptacles are comparatively thin. Thus the heat which is absorbed through the narrow faces is dissipated from comparatively wide surfaces to the refrigerant in the receptacles and to the air or other fluid refrigerant which is circulated between the receptacles. The heat dissipating surface of each receptacle is very much greater in area than the heat absorbing surface and should be at least twice the area of said heat absorbing surface. As a result there is a very rapid and highly efficient extraction of the heat from the substance being treated. With this relationship of heat absorbing to heat extracting surface the conveyor is effectively cooled by the circulating refrigerant even though the other refrigerant, namely, that in the receptacles, be omitted.

I have referred to the material as ice cream, but it will be evident that various other analogous materials might be employed in the same apparatus or in a different design within the scope of my invention.

The apparatus may be used in connection with any material which is delivered in a plastic form and which is to be hardened or solidified by a change in temperature while passing through the hardening chamber.

It will be noted that the material passes from the delivery conduit to the paper and does not contact with any part of the apparatus except the cutters after leaving the receiving receptacle 13.

In the form illustrated the conveyors engage with all four sides of the tubular wrapper, but it will be obvious that if desired the edges of the wrapper need not be folded over the top of the ice cream bar and thus the upper conveyor 22 may be omitted. The four conveyors illustrated cause the ice cream bar to assume a rectangular form in cross-section, but it will, of course, be obvious that by using a larger or smaller number of conveyors properly juxtaposed, the bar might be of other cross-sectional form.

I have described the apparatus as for producing ice cream bricks. By the term "brick" I do not wish to be limited to a brick of the size now commonly known as an ice cream brick and which includes a pint or quart of ice cream. The apparatus is particularly intended for making small bricks, such as would constitute individual portions for direct serving to the consumer.

Having thus described my invention, what I claim as new and desire to secure by Letters Patent is:

1. An apparatus for the continuous production of ice cream bricks, including means for delivering a continuous strip of wrapping material in substantially channel form, means for continuously delivering partially frozen ice cream into which air has been whipped into said channel, means for folding over the edges of said wrapping material to form a tube enclosing the material, and means for reducing the temperature of the material to further freeze the same.

2. An apparatus for forming ice cream bricks, including means for delivering a strip of wrapping material in substantially channel form, means for delivering the partially frozen ice cream into said channel, and conveying means for continuously advancing the wrapping material with the ice cream therein, said conveying means also serving to further freeze the ice cream to harden the same during its advancing movement.

3. An apparatus for forming ice cream bricks, including means for delivering a strip of wrapping material in substantially channel form, means for delivering the partially frozen ice cream into said channel, conveying means for continuously advancing the wrapping material with the ice cream therein, means for further freezing the material during its advancing movement, and means for subdividing the hardened ice cream into successive separate sections.

4. An apparatus for continuously forming bricks of plastic comestible material, including means for delivering a wrapper in substantially channel form, means for delivering material into the channel, means for folding over the edges of the channel to enclose the material, a hardening chamber, means for maintaining said chamber at a temperature below the freezing point of water, and means for advancing the material and wrapper through said chamber, said wrapper serving to prevent the material from freezing to said advancing means.

5. An apparatus for forming bricks of plastic comestible material, including means for delivering the material to a channel shaped wrapper and folding the latter to tubular form to enclose the material, and a plurality of endless refrigerating conveyors juxtaposed to form a passage corresponding in size and cross-section to said tube and engaging with the latter to continuously advance it, said wrapper serving to prevent the material from freezing to or adhering to said conveyors.

6. An apparatus for forming bricks of plastic comestible material, including means for delivering the material to a channel shaped wrapper and folding the latter to tubular form to enclose the material, a plurality of endless conveyors juxtaposed to form a passage corresponding in size and cross-section to said tube and engaging with the latter to continuously advance it, a chamber enclosing said conveying means, and means for maintaining said chamber at a low temperature to effect the solidification of said material, said wrapper serving to prevent the material from freezing to or adhering to said conveyors.

7. An apparatus for forming bricks of plastic material, including means for delivering the material to a continuous strip to form a wrapper and folding the latter to tubular form to enclose the material, a plurality of endless conveyors juxtaposed to form a passage corresponding in size and cross-section to said tube and engaging with the latter to continuously advance it, a chamber enclosing said conveying means, means for maintaining said chamber at a low temperature to effect the solidification of said material, and means for continuously severing the tube and material into successive sections without substantially deforming the wrapper or material.

8. An apparatus for forming bricks of edible material including means for continuously advancing a strip of wrapping material and bending it to channel form, means for delivering the partially frozen material into the channel, a chamber, means for maintaining said chamber at a temperature low enough to freeze the ice cream, a plurality of conveyors in said chamber for engaging with the wrapping material to continuously advance the latter and the material carried thereby, and means outside of said chamber for subdividing the hardened material and wrapper into successive sections.

9. An apparatus for forming bricks of edible material, including means for continuously advancing a strip of wrapping material and bending it to channel form, means for delivering the partially frozen material into the channel, a chamber, means for maintaining said chamber at low temperature, and a plurality of conveyors in said chamber for engaging with the wrapping material to continuously advance the latter and the edible material carried thereby, said conveyors being formed of heat transferring material.

10. An apparatus for forming bricks of edible material, including means for continuously advancing a strip of wrapping material and bending it to channel form, means for delivering the partially frozen material into the channel, a chamber, means for maintaining said chamber at low temperature, and a plurality of conveyors in said chamber for engaging with the wrapping material to continuously advance the latter and the edible material carried thereby, said conveyors including a series of cooling receptacles for direct and successive engagement with the wrapper.

11. An apparatus for forming bricks of ice cream or the like, including means for progressively forming a tube with partially frozen material therein, and a conveyor for engaging said tube to advance the latter, said conveyor including a series of connected refrigerant receptacles for direct contact with said tube.

12. An apparatus for forming bricks of edible material, including means for continuously forming a tube of wrapping material with partially frozen material therein, and an endless series of refrigerant receptacles connected together and engaging said tube to advance the latter.

13. An apparatus for forming bricks of edible material, including means for continuously forming a tube of wrapping material with partially frozen material therein, an endless series of refrigerant receptacles connected together and engaging said tube to advance the latter, a chamber enclosing said conveyor and through which said tube passes, and means for maintaining said chamber at a low temperature whereby the refrigerant in said receptacles extracts heat from said material during one run of the conveyor and is rechilled during the return run.

14. Means for hardening partially frozen edible material, including a cooling chamber, means for delivering thereto a tubular wrapper containing the said material to be hardened, and a plurality of conveyors juxtaposed to form a passage for said tube, said conveyors engaging the tube to advance the latter and to simultaneously refrigerate it.

15. An apparatus for forming bricks of edible material which includes a hardening chamber, means for maintaining said chamber at a low temperature, a conveyor within said chamber, means for delivering the partially frozen material to said conveyor, and means for varying the speed of the conveyor in accordance with the rate of delivery of the partially frozen material.

16. An apparatus for forming bricks of edible material which includes a hardening chamber, means for maintaining said chamber at a low temperature, a conveyor within said chamber, and serving to maintain the bar of said material predetermined cross-sectional area, means for delivering the partially frozen material to said conveyor, and means for subdividing the bar of hardened material into separate successive sections.

17. An apparatus for forming bricks of edible material, including means for continuously delivering partially frozen material, means for enclosing said material in a tubular wrapper and continuously advancing the latter, means for hardening the material within said wrapper, and means for subdividing the hardened material and wrapper into separate successive sections.

18. An apparatus for forming bricks of edible material, including means for continuously delivering partially frozen material, means for enclosing said material in a tubular wrapper, and continuously advancing the latter, means for hardening the material within said wrapper, means for subdividing the hardened material and wrapper into separate successive sections, and means for varying the speed of said subdividing means in accordance with the rate of delivery of the partially frozen material.

19. An apparatus for reducing the temperature of a substance, including a conveyor adapted to receive the substance and advance the latter, said conveyor having a plurality of refrigerant receptacles.

20. An apparatus for continuously advancing and chilling a substance, including a chamber, and an endless series of refrigerant receptacles movable therein.

21. An apparatus for reducing the temperature of a substance, including a plurality of refrigerant storage receptacles of heat transferring material, each having a comparatively narrow surface juxtaposed to said substance for advancing the latter and comparatively wide side surfaces.

22. An apparatus for reducing the temperature of a substance, including a plurality of movable members for advancing the substance along a predetermined path, said members having heat absorbing surfaces juxtaposed to said substance on separate sides of the latter and heat dissipating surfaces of an area greater than the area of the heat absorbing surfaces.

23. An apparatus for continuously advancing and chilling a substance, including an endless series of refrigerant receptacles, each having a comparatively narrow wall juxtaposed to said material and comparatively wide side walls.

24. An apparatus for continuously advancing a substance and reducing the temperature thereof, including a pair of conveyors each having a movable heat absorbing wall for advancing the material, said conveyors coacting to define the path of movement of the material, and a plurality of heat dissipating walls extending from said first mentioned wall, and of greater area than the latter.

25. An apparatus for continuously advancing a substance and reducing the temperature thereof, including conveyor means having a pair of spaced movable heat absorbing walls forming a path therebetween for advancing the material, a plurality of heat dissipating walls extending from said first mentioned walls, and of greater area than the latter, and means for subjecting said dissipating walls to the action of a refrigerating medium.

26. An apparatus for continuously advancing a substance and reducing the temperature thereof, including a pair of conveyors on opposite sides of the substance and each having a movable heat absorbing wall for advancing the material, a plurality of heat dissipating walls extending from said first mentioned wall, and of greater area than the latter, and means for circulating a refrigerating medium in contact with said heat dissipating walls.

27. An apparatus for continuously advancing a substance and reducing the temperature thereof, including a chamber, a conveyor within said chamber for advancing the material, a movable heat absorbing wall at an angle to said conveyor for engaging the material during the advancing of the latter, a plurality of heat dissipating walls extending from said first mentioned wall, and of greater area than the latter, and means for maintaining said chamber at a low temperature.

28. An apparatus for reducing the temperature of a substance, including a plurality of refrigerant storage receptacles of heat transferring material, and means for moving said receptacles into and out of operative relationship to the substance and advancing said receptacles with the substance.

29. An apparatus for reducing the temperature of a substance, including a plurality of refrigerant storage receptacles of heat transferring material, and means for moving said receptacles into and out of operative relationship to the substance and advancing said receptacles with the substance, each of said receptacles having a comparatively narrow surface juxtaposed to said substance and comparatively wide side surfaces.

30. An apparatus for forming bricks of edible material, which includes a hardening chamber, means for maintaining said chamber at a low temperature, a conveyor within said chamber, means for delivering the partial frozen material to said conveyor, said conveyor serving to maintain said material of predetermined cross-sectional area, and means for subdividing the bar of hardened material into separate successive sections.

31. An apparatus of the character described, including means for enclosing a food product in a non-edible, thin, flexible casing, a pair of endless conveyors having superposed parallel runs for engaging the top and bottom surfaces of said casing and advancing the latter, and means for applying refrigerant to the side surfaces of said casing and laterally supporting said side surfaces during said advancing movement.

32. An apparatus for preparing a solid body of refrigerated edible material, including means for delivering a channel shaped strip of wrapping material in an endwise direction, a receptacle disposed within the channel and having an open side facing in the direction of movement of said strip, means for delivering the material to said receptacle whereby the material may flow into the channel and be advanced therewith, and means for refrigerating the material through the walls of said strip during the advancing movement.

33. An apparatus for preparing a solid body of refrigerated edible material, including means for delivering a channel shaped strip of wrapping material in an endwise direction, means extending into the channel of said strip for delivering the material under pressure, means for closing the strip to form a casing of tubular form and maintaining the material in said casing under at least a part of said pressure, and means for refrigerating the material to solid form in said casing during the advancing movement of the casing and material.

34. An apparatus for hardening a plastic comestible into a form sustaining consistency, including means for delivering endwise a continuous strip of thin, flexible material and progressively forming a channel shaped casing, a trough having side walls formed of heat conducting material for laterally supporting said casing, means for advancing said trough and casing endwise, means for delivering the comestible to said casing progressively along the length thereof during said advancing movement, and means for freezing the comestible into a bar while supported by said trough, said casing serving to prevent said comestible from contacting with and freezing to said side walls.

35. An apparatus for hardening a comestible to form sustaining consistency, including means for delivering in an endwise direction a continuous elongated trough shaped flexible casing, means for delivering the comestible to said casing during said endwise movement, means for advancing said casing endwise during the delivery of the comestible thereto, said means including heat conducting members for supporting the sides of said casing to prevent bulging, and means for subjecting the comestible to refrigeration to harden the same while so supported by said heat conducting members.

36. An apparatus for freezing a comestible including a series of refrigerant containing receptacles each having a heat transferred surface, said surfaces being arranged in substantially the same plane along the path of movement of the comestible and means for moving said receptacles to advance the comestible along said path.

37. An apparatus for freezing a comestible in a non-edible casing including two refrigerant containing receptacles spaced apart to receive the encased comestible therebetween and support the opposite sides of said casing, and means for moving said receptacles to thereby advance the comestible along a predetermined path.

38. An apparatus for hardening plastic material into a form sustaining consistency, including two spaced rows of refrigerant containing receptacles forming therebetween a path for the material to be hardened, and means for moving said receptacles to advance the material along said path.

39. An apparatus for hardening a comestible including a belt for supporting and advancing the comestible and two rows of refrigerant containing receptacles at opposite sides thereof and having heat transfer surfaces for abstracting heat from the sides of the comestible on said belt, and movable into and out of heat abstracting and supporting relationship to said comestible during the advance of the latter.

40. An apparatus for hardening a comestible including a row of refrigerant containing receptacles each having a heat transfer surface, means for moving said receptacles to bring said surfaces into and out of heat abstracting relationship with the comestible and to advance the comestible.

Signed at city of Toronto, in the county of York and Province of Ontario, this 23 day of October, A. D. 1929.

CLARENCE W. VOGT.